(12) United States Patent
La Torre et al.

(10) Patent No.: US 9,861,069 B2
(45) Date of Patent: Jan. 9, 2018

(54) CLAW FOR A MILKING MACHINE

(71) Applicant: DELAVAL HOLDING AB, Tumba (SE)

(72) Inventors: Carlos La Torre, Tumba (SE); Anna Andersson, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 379 days.

(21) Appl. No.: 14/647,453

(22) PCT Filed: Dec. 18, 2013

(86) PCT No.: PCT/SE2013/051555
§ 371 (c)(1),
(2) Date: May 27, 2015

(87) PCT Pub. No.: WO2014/098750
PCT Pub. Date: Jun. 26, 2014

(65) Prior Publication Data
US 2015/0320005 A1    Nov. 12, 2015

Related U.S. Application Data

(60) Provisional application No. 61/739,166, filed on Dec. 19, 2012.

(30) Foreign Application Priority Data

Dec. 19, 2012 (SE) ........................................ 1251460

(51) Int. Cl.
*A01J 5/00* (2006.01)
*A01J 5/04* (2006.01)

(52) U.S. Cl.
CPC ................................... *A01J 5/041* (2013.01)

(58) Field of Classification Search
CPC .... A01J 5/041; A01J 5/00; A01J 5/017; A01J 5/0175
(Continued)

(56) References Cited

U.S. PATENT DOCUMENTS 4,280,445 A * 7/1981 Phillips .................... A01J 5/041
                                                  119/14.02
5,052,341 A * 10/1991 Woolford ................ A01J 5/041
                                                  119/14.17
(Continued)

FOREIGN PATENT DOCUMENTS

DE     66 04 310 U    1/1970
RU     2 457 675 C2   8/2012
(Continued)

OTHER PUBLICATIONS

International-Type Search Report, dated Jun. 11, 2013, from corresponding PCT application.
(Continued)

*Primary Examiner* — Matthieu F Setliff
*Assistant Examiner* — George Andonyan
(74) *Attorney, Agent, or Firm* — Young & Thompson

(57) ABSTRACT

A claw (C) for a milking machine includes an enclosure having an upper part (1) and a lower part (2) and enclosing an inner space (3) for a milk flow during a milking operation. The lower part includes a bottom surface (4) facing the inner space. An outlet nipple (12), connected to a long milk conduit (13), extends outwardly from the upper part. A suction tube (20) connects the inner space to the outlet nipple, and includes a lower tube section close to the bottom surface. Three support legs extend from the lower tube section and abut the bottom surface, thereby forming a gap between the lower tube section and the bottom surface. Each support leg has an end point, which end points are located (Continued)

in a common lower plane. The common lower plane is inclined to the center axis.

18 Claims, 4 Drawing Sheets

(58) Field of Classification Search
USPC .............................. 119/14.54, 14.55, 14.37
See application file for complete search history.

(56) References Cited

U.S. PATENT DOCUMENTS

| | | |
|---|---|---|
| 5,076,211 A | 12/1991 | Tonelli |
| 5,291,853 A | 3/1994 | Steingraber et al. |
| 5,988,105 A | 11/1999 | Sandgren |
| 6,006,695 A | 12/1999 | Gustafsson |
| 6,058,880 A | 5/2000 | Gustafsson et al. |
| 6,401,655 B1 | 6/2002 | Terwilleger |
| 6,543,382 B1 | 4/2003 | Kolstad et al. |

FOREIGN PATENT DOCUMENTS

| | | |
|---|---|---|
| SU | 1523139 A1 | 11/1989 |
| SU | 1639537 A1 | 4/1991 |

OTHER PUBLICATIONS

International Search Report, dated May 8, 2014, from corresponding PCT application.
Supplementary International Search Report, dated Jan. 22, 2015, from corresponding PCT application.

* cited by examiner

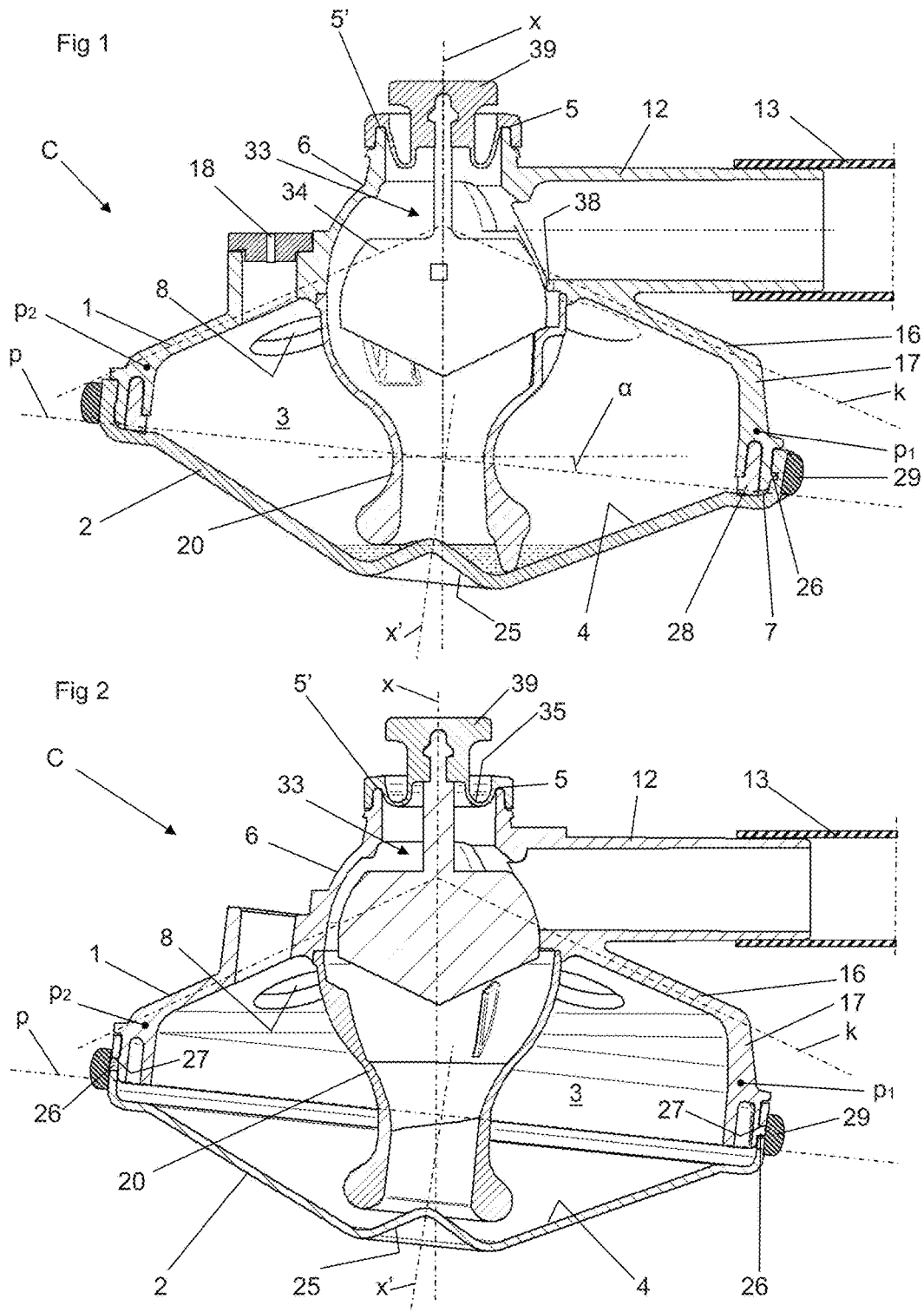

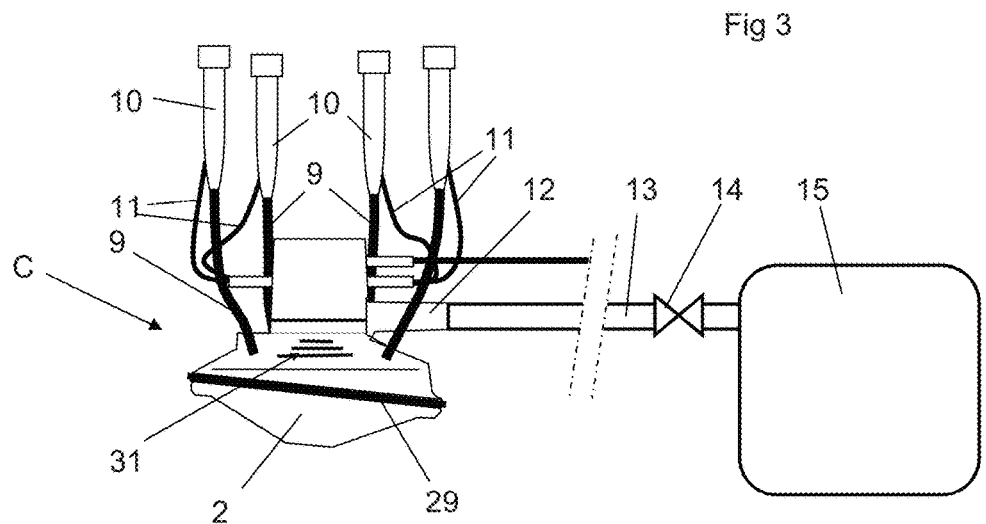
Fig 3
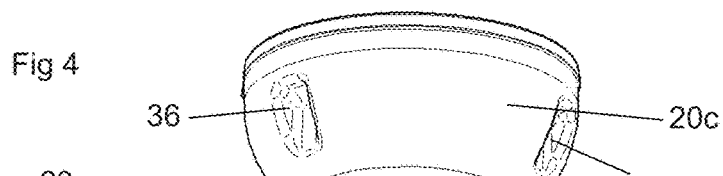
Fig 4
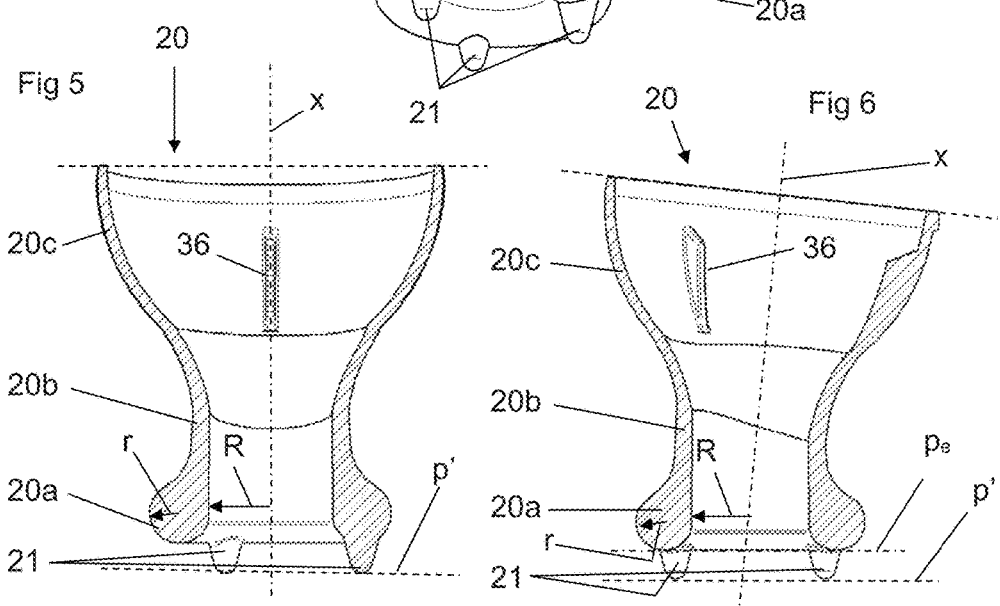
Fig 5
Fig 6

CLAW FOR A MILKING MACHINE

TECHNICAL FIELD OF THE INVENTION

The present invention refers generally to a claw, or a teatcup claw, included in a milking member of a milking machine. More specifically, the present invention refers to a so called top flow claw, where an outlet nipple, which is connected to the long milk conduit for the discharge of milk from the claw, is mounted on 10 the top of the claw. In particular, the present invention refers to a claw such as one disclosed in U.S. Pat. No. 6,058,880.

BACKGROUND OF THE INVENTION AND PRIOR ART

The claw disclosed in U.S. Pat. No. 6,058,880 collects milk from the teatcups via the short milk conduits. The collected milk is continuously transported from the claw to a suitable milk storage via the long milk conduit. The known claw is a top flow claw having a suction tube connecting the inner space of the claw with the outlet nipple for the discharge of the milk through the long milk conduit from the claw. This means that the milk to be transported has to be lifted from the bottom of the inner space of the claw to the outlet nipple. Such top flow claws are also disclosed in U.S. Pat. No. 6,006,695 and U.S. Pat. No. 5,076,211.

Another problem to be considered is the ergonomic design of the claw. A claw having a large thickness may be difficult to grip and hold during the attachment of the teatcups to the teats of the animal to be milked. It is important that the operator may grip the claw and hold it firmly in a convenient manner during said attachment.

A still further problem to be considered is the visibility and the possibility for the operator to observe the milk flow through the claw.

SUMMARY OF THE INVENTION

The object of the present invention is to provide a claw having improved properties with respect to ergonomics.

This object is achieved by the claw initially defined, which is characterised in that the common lower plane is inclined to the centre axis so that the centre axis is non-perpendicular to the common lower plane.

By inclining or sloping the common lower plane, it is possible let the lower part slope with respect to the upper part so that the thickness of the enclosure, and thus the claw, is reduced on one side of the claw. As a consequence, the height of the inner space may be reduced as well as the total volume of the inner space. This also means that the height of the suction tube may be reduced, which enables a reduction of the energy required for transporting the milk, and especially for lifting the milk through the suction tube to the outlet nipple.

Furthermore, the reduced thickness of the claw is positive from an ergonomic point of view due to the fact that the claw is easier to grip and hold for the operator during the attachment of the teatcups to the teats of the animal.

Thanks to the inclination, the visibility of the milk flow may be maintained through the thicker side of the claw, which advantageously may be transparent or at least may comprise a transparent zone. The milk and the milk flow may be observed clearly and properly through a transparent zone at this position.

A small volume of the inner space may also be advantageous with respect to the quality of the milk. A small volume means less air contact, and less oxidation of important substances in the milk.

According to an embodiment of the invention, the suction tube has an upper end defining an upper plane which is inclined to the common lower plane.

According to a further embodiment of the invention, the suction tube comprises an upper tube section extending from the upper end to an intermediate tube section, wherein the intermediate tube section extends from the upper tube section to the lower tube section. Advantageously, the upper tube section is tapering from the upper end to the intermediate tube section to form an internal space which is concavely shaped.

According to a further embodiment of the invention, the claw comprises a closing valve comprising a valve body provided at the upper tube section, and possibly extendable into the internal space. Advantageously, the suction tube may comprise at least three projections projecting into the internal space defining an end position for the valve body. When in this end position, the closing valve is open so that the milk may flow from the inner space into the suction tube and out through the outlet nipple. Preferably, the flow area of the suction tube is constant, or substantially constant along the length of the suction tube. Thanks to the tapering upper tube section, the flow area may be kept constant also when the valve body is in the open end position.

According to a further embodiment of the invention, the intermediate tube section is cylindrical, or substantially cylindrical.

According to a further embodiment of the invention, the suction tube is a separate part attached by friction to the upper part.

According to a further embodiment of the invention, the gap has a first height at a first position along the lower tube section and a second height at a second position along the lower tube section and diametrically opposite to the first position, and wherein the first height is greater than the second height. Advantageously, the suction tube comprises three support legs, wherein at least one of the support legs may have a length that is different from the length of at least one of the other support legs.

According to another embodiment of the invention, the lower tube section defines an annular end line, from which the support legs extend, and wherein the annular end line defines an end plane being inclined in relation to the centre axis. Advantageously, the support legs may then have equal length.

According to a further embodiment of the invention, the upper part comprises an upper end defining an upper end point, and a lower annular end extending along a periphery of the claw in a connection plane, wherein the lower part is detachably connected to the upper part along the connection plane, and wherein the connection plane is inclined with respect to the centre axis so that the enclosure have a first thickness at a first peripheral position and a second thickness at a second peripheral position diametrically opposite to the first peripheral position, and that the first thickness is greater than the second thickness.

According to a further embodiment of the invention, the lower tube section comprises a torus-shaped ring with a radius r when seen in a cross-sectional plane including the centre axis, wherein the tube at the lower tube section has an inner radius R, and wherein the relation r/R lies in the range 0.3 to 0.7, for instance 0.45.

According to a further embodiment of the invention, wherein the lower part comprises a central depression extending inwardly.

BRIEF DESCRIPTION OF THE DRAWINGS

The present invention is now to be explained more closely through a description of various embodiments and with reference to the drawings attached hereto.

FIG. 1 shows schematically a sectional view through a claw according to a first embodiment of the invention.

FIG. 2 shows schematically a sectional view through a claw according to a second embodiment of the invention.

FIG. 3 shows schematically a side view of a milking member comprising a claw according to the present invention.

FIG. 4 shows schematically a perspective view of a suction tube of the claw in FIG. 1.

FIG. 5 shows schematically a sectional view of the suction tube in FIG. 4.

FIG. 6 shows schematically a perspective view of a suction tube of the claw in FIG. 2.

DETAILED DESCRIPTION OF VARIOUS EMBODIMENTS OF THE INVENTION

Figure 7:
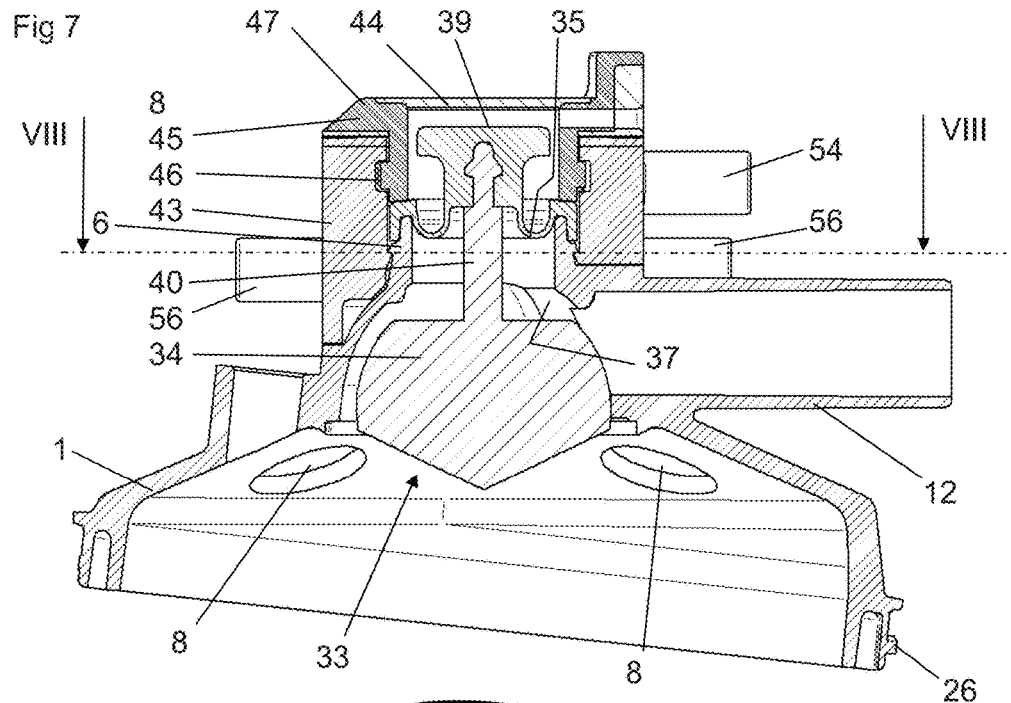
FIG. 7 shows schematically a sectional view of an upper part of the claw in FIGS. 1 and 2.

FIGS. 1 to 4 discloses a claw C, or a teatcup claw C, of a milking member for a milking machine. The claw C comprises an enclosure having an upper part 1 and a lower part 2. The enclosure encloses an inner space 3 for receiving milk and conveying a milk flow during a milking operation. The lower part 2 comprises a bottom surface 4 facing the inner space 3. A centre axis x extends through the enclosure and through the upper part 1 and the lower part 2. The upper part 1 comprises an upper end 5 having an annular shape and defining an upper end point 5', or an upper end plane. The upper part 1 also comprises an upper end portion 6 extending from the upper end 5. Furthermore, the upper part 1 comprises a lower annular end 7 extending along a periphery of the claw C in or at a connection plane p. The lower part 2 is detachably connected to the upper part 1 along the connection plane p.

The claw C comprises a plurality of inlet members 8 configured for receiving a respective short milk conduit 9 of a respective teatcup 10 of the milking member, see FIG. 3. Each teatcup 10 is configured to be attached to a respective teat of an animal to be milked during a milking operation. The milking member also comprises four short pulse conduits 11, one for each teatcup 10.

The claw C disclosed comprises four inlet members 8 which each extends through the upper part 1 to permit feeding of milk to the inner space 3 from the respective teatcup 10 and the respective teat. The claw C also comprises an outlet nipple 12 configured for being connected to a long milk conduit 13 for the discharge of milk from the inner space 3 to a milk receiving member 15 of a milking machine. The outlet nipple 12 extends outwardly with respect to the centre axis x from the upper part 1 of the enclosure. During the milking operation, milk is sucked through the teatcups 10, the short milk conduits 9 into the inner space 3 of the claw C by means of the application of a milking vacuum generated by a vacuum pump (not disclosed). From the inner space 3, the milk is then sucked through the long milk conduit 13 to the milk receiving member 15 by means of the vacuum pump. A shut-off valve 14 may be provided on the long milk conduit 13 permitting automatic shut-off of the milk vacuum between the milking operations.

The upper part 1 comprises an upper wall 16, through which the inlet members 8 extend, and a side wall 17 connected to the upper wall 16. The side wall 17 thus adjoins the upper wall 16 at an outer corner extending around the enclosure. The upper wall 16 adjoins the upper end portion 6 at an inner corner extending around the enclosure. An air inlet 18 extends into the inner space 3 from the surroundings, and in the embodiments disclosed through the upper part 1.

The upper wall 16 extends along a cone k, which is rotary symmetric around the centre axis x, see FIG. 2. The side wall 17 has a varying wall height along the periphery of the claw C. More specifically, the side wall 17 has a first wall height that a first peripheral position $p_1$ and a second wall height at a second peripheral position $p_2$. The first wall height is larger than the second wall height. The first peripheral position $p_1$ is diametrically opposite to the second peripheral position $p_2$.

As can be clearly seen in FIGS. 1 and 2 the connection plane p is inclined with respect to the centre axis x so that the enclosure have a first height at the first peripheral position $p_1$ and a second height at the second peripheral position $p_2$, i.e. that the first height is greater than the second height. The connection plane p thus forms an angle α of inclination to a plane perpendicular to the centre axis x, or horizontal plane. The angle α may be 4-8°, for instance 6° or approximately 6°. In the embodiments disclosed, this varying height of the claw C is thus achieved by varying the wall height of the side wall 17. It is to be noted that the varying height also could be achieved by a non-rotary symmetric configuration of the upper wall 16 so that at least a part of the varying height of the claw C is achieved by the upper wall 16.

The lower part 2 is rotary symmetric with respect to an axis x' of rotation, which axis x' is perpendicular to the connection plane p, see FIG. 2, and thus forms an angle of indication to the centre axis x, being equal to the angle α.

The claw C also comprises a suction tube 20 which is provided in the inner space 3 and which connects the inner space 3 to the outlet nipple 12 for conveying the milk from the inner space 3 to the outlet nipple 12. The suction tube 20 comprises a lower tube section 20a, an intermediate tube section 20b and an upper tube section 20c, see FIGS. 4-6. The upper tube section 20c extends from an upper end of the suction tube 20 to the intermediate tube section 20b, and the intermediate tube section 20b extends from the upper tube section 20c to the lower tube section 20a. The lower tube section 20a is positioned above and in the proximity of the bottom surface 4 of the lower part 2.

The suction tube 20 comprises at least three support legs 21 extending from the lower tube section 20a and abutting the bottom surface 4. The suction tube 20 may comprises more than three support legs 21 as shown in the following description of the embodiments. Thanks to the support legs 21, a gap is formed between the lower tube section 20a and the bottom surface 4. Each support leg 21 has an end point.

The end points of the support legs 21 are located in, or define, a common lower plane p' which is inclined to the centre axis x so that the centre axis x is non-perpendicular to the common lower plane p'. Thus, the centre axis x forms an angle to the common lower plane p', which angle deviates from 90°.

The common lower plane p' may be parallel with the connection plane p.

The upper end of the suction tube 20 is located in or defines an upper plane which also is inclined to the common lower plane p'.

The suction tube 20 is a separate part which may be attached by friction to the upper part 1. As can be seen in FIGS. 1 and 2, the suction tube can be fitted in a circular recess in the upper part 1.

The upper tube section of 20c of the suction tube 20 is tapering from the upper end to the intermediate tube section 20b to form an internal space which is a concavely shaped as can be seen in FIGS. 1, 2 and 4-6. The upper tube section 20c has a convexly shaped outer surface. The intermediate tube section 20b is cylindrical, or substantially cylindrical. The lower tube section 20a comprises a thickened torus-shaped ring with a radius r, when seen in a cross sectional plane including the centre axis x. The suction tube 20 has an inner radius R at the lower tube section 20a. The relation r/R lies in the range 0.3 to 0.7, for instance 0.45, see FIGS. 5 and 6.

The suction tube 20 is shown in two variants one first variant for the first embodiments shown in FIGS. 1, 4 and 5, and a second variant for the second embodiment shown in FIGS. 2 and 6.

In the first variant, the gap between the lower tube section 20a and the bottom surface 4 has a varying height with a first height at a first position along the lower tube section 20a, and a second height at a second position along the lower tube section 20a. The second position is diametrically opposite to the first position. The first height is greater than the second height. The first position is located on the same radial line as the first peripheral position with respect to the centre axis x. The second position is located at the same radial line as the second peripheral position with respect to the centre axis x. In this variant at least one of the support legs 21 has a length that is different from the length of at least one of the other support legs 21.

In the first variant, the upper plane of the suction tube 20 is perpendicular to the centre axis x.

In the second variant, the lower tube section 20a defines an annular end line from which the support legs 21 extend. The annular end line defines an end plane $p_e$, see FIG. 6, which is inclined in relation to the centre axis x. In this second variant, all support legs 21 have the same length. Thus, the end plane $p_e$ is parallel with the common lower plane p'.

In the second variant, the upper plane of the suction tube 20 is inclined with respect to the centre axis x.

The upper part 1 is at least partly made of a transparent material to enable observation of the milk flow in the inner space 3 during the milking operation. Advantageously, the whole upper part 1 may be made of the same transparent material. It is important that there is a transparent zone extending inside the first peripheral position where the side wall 17 has the largest height. The lower part 2 may be made of a plastic, transparent or non-transparent material as illustrated in FIG. 1. The lower part 2 may also be made of a metallic material as illustrated in FIG. 2. The lower part 2 comprises a central depression 25 extending inwardly into the inner space 3 towards the interior of the suction tube 20.

The lower part 2 is detachably connected to the upper part 1 along the connection plane p by means of a bayonet coupling as can be seen in FIGS. 1, 2 and 7. The bayonet coupling comprises at least two pins 26 extending from one of the upper part 1 and the lower part 2, in the present case from the upper part 1. The bayonet coupling also comprises at least two grooves 27 which in the present case thus is provided in the lower part 2, and configured to receive a respective one of the pins 26. With such a bayonet coupling, the lower part 2 may be easily detached from the upper part 1, and attached to the upper part 1. Such a bayonet coupling will also contribute to compress an annular gasket 28, see FIG. 1, provided between the upper part 1 and the lower part 2 at the connection plane p, to seal the inner space 3 from the environment.

Figure 8:
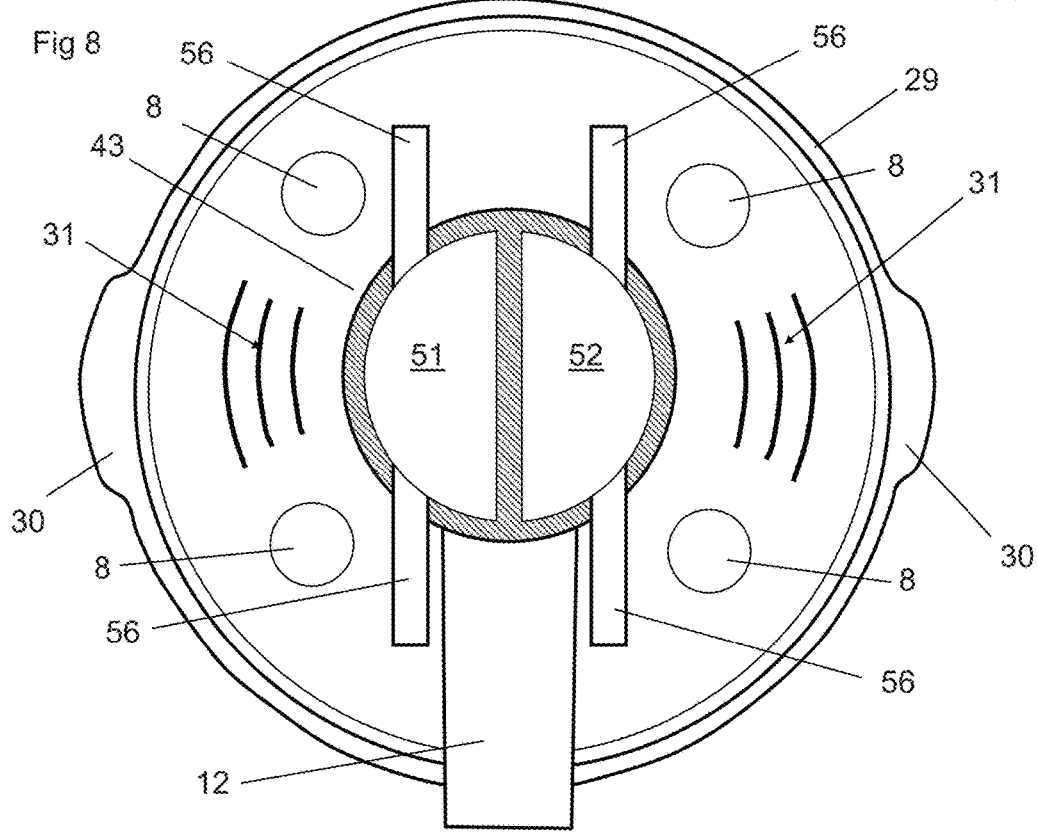
FIG. 8 shows schematically a sectional view along the line VIII-VIII in FIG. 7.

The claw C also comprises a peripheral ring 29, which extends along the periphery of the claw C at the connection plane p, see FIGS. 2 and 8. The peripheral ring 29 is made of an elastic material, for instance a rubber material, such as natural rubber or silicon rubber. The peripheral ring 29 comprises at least one, in the present case two, outwardly extending wings 30 positioned between the first peripheral position and the second peripheral position.

Furthermore, the upper part 1 has at least one, in the present case, two grip-facilitating patterns 31 provided on the outer surface of the upper part 1, see FIGS. 3 and 8. The patterns 31 are located radially inside a respective one of the wings 30. Each pattern 31 comprises three ribs on different distance from the centre axis x. The ribs extend in parallel with each other and the periphery of the enclosure.

The claw C also comprises a closing valve 33, which comprises a valve body 34 provided at the upper tube section 20c of the suction tube 20. The valve body 34 is movable to a closed position, see FIG. 11, in which the passage from the inner space 3 to the outlet nipple 12 is closed, and to an open position, see FIG. 10, in which the passage from the inner space 3 to the outlet nipple 12 is open. The closing valve 33 also comprises a membrane 35 which is connected to the valve body 34 and attached to the upper end portion 6 of the upper part 1. The membrane 35 has a rest state, in which the membrane 35 holds the valve body 34 in an intermediate position between the open position and the closed position, see FIG. 9.

In the rest state, there is no pressure difference over the valve body 34, i.e. the pressure on one side of the valve body 34, i.e. in the inner space 3, is equal to the pressure on the other side of the valve body 34, i.e. inside the outlet nipple 12. Moreover, in the rest state the membrane 35 may be in its most relaxed state with a minimum of internal tensions or stresses.

Figure 9:
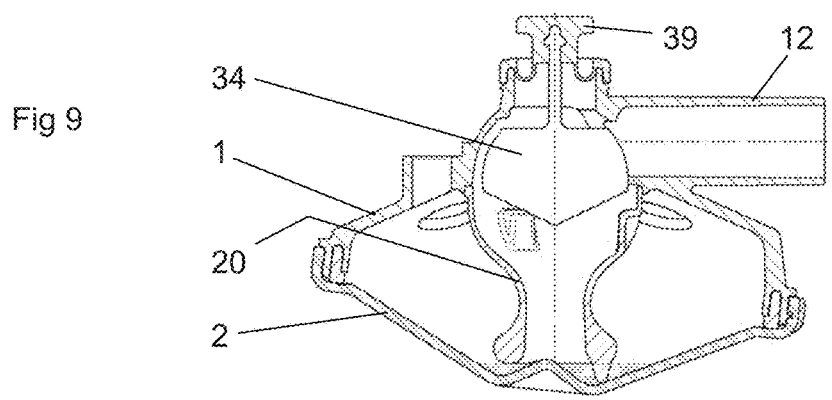
FIG. 9 shows schematically a sectional view of the claw according to the first embodiment with a valve body in an intermediate position.

The membrane 35 is configured for automatically moving the valve body 34 to the open position, to the closed position or to the intermediate position, see FIG. 9, between the open position and the closed position. Especially, the closing valve 33 and the membrane 35 is configured in such a way that the valve body 34 may be moved, or moved very quickly, from the intermediate position to the closed position or to the open position. The configuration of the membrane 35 to take the intermediate position when the membrane 35 is in its rest position thus provides for a closing valve 33 having a quick response.

When the shut-off valve 14 is closed, the membrane 35 will be in the rest state, i.e. the valve body 34 will be moved to and held in the intermediate position.

The closing valve 33 comprises a physical stop member defining the open position. In the embodiments disclosed, the physical stop member comprises at least three projections 36 projecting into the internal space of the upper tube section 20c of the suction tube 20.

The closing valve 33 also comprises a valve seat 37 defining the closed position. The valve body 34 thus rests against the valve seat 37 in the closed position.

Figure 11:
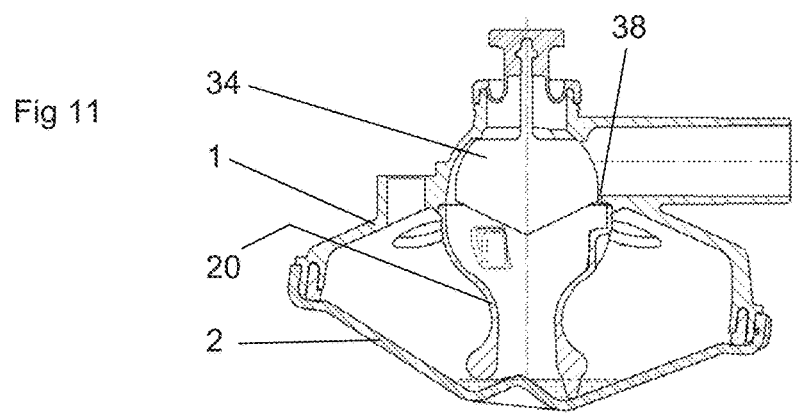
FIG. 11 shows schematically a view similar to the one in FIG. 9 with the valve body in a closed position.

Furthermore, a leakage channel 38 is provided for permitting a leakage flow from the inner space 3 to the outlet nipple 12 when the valve body 34 is in the closed position. In the embodiments disclosed, the leakage channel 38 is formed by a recess in the valve seat 37 as can be seen in FIGS. 1 and 11.

Furthermore, the closing valve 33 comprises a button member 39 connected to the valve body 34 via a rod 40. The button member 39 permits manual moving of the valve body 34, in particular towards the open position. The button member 39 projects upwardly from the upper part 1.

The claw C also comprises a housing 43, see FIGS. 7 and 8, which is attached to the enclosure and encloses the button member 39. The housing 43 comprises a cover 44 located outside the button member 39 to permit the manual moving of the valve body 34 by manual pressing of the cover 44.

The cover 44 is in the embodiment disclosed a part of an insert member 45 attached to an upper end portion of the housing 43 by means of a bayonet coupling 46. The insert member 45 comprises a base portion 47 to which the cover 44 is attached. The base portion 47 is made of a first material and the cover 44 is made of another, second material. The second material is resilient, or more resilient that the first material, thereby permitting the cover 44 to be elastically deformed.

The housing 43 comprises two separate channels, a first channel 51 and a second channel 52, see FIG. 7. Each channel 51, 52 has an inlet pipe 54, see FIG. 7, and two outlet pipes 56, see FIG. 8, for distributing a pulsating vacuum to the teatcups 10. The inlet pipes 54 and the outlet pipes 56 extend in parallel with each other, and with the outlet nipple 12. The two outlet pipes 56 of the first channel 51 extend in opposite directions, as well as the two outlet pipes 56 of the second channel 52.

Figure 10:
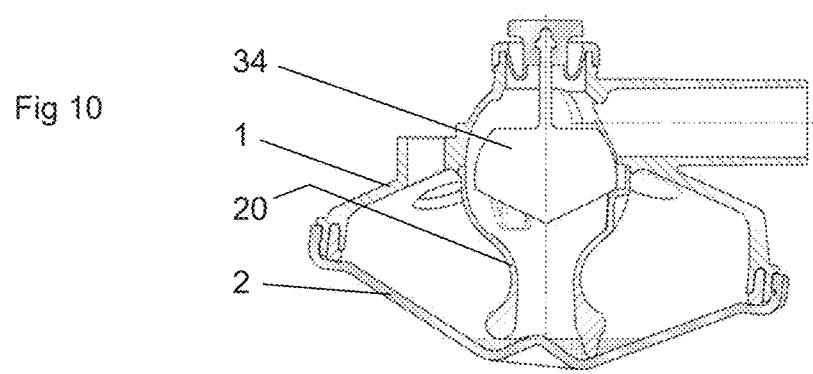
FIG. 10 shows schematically a view similar to the one in FIG. 9 with the valve body in an open position.

With reference to FIG. 10, the membrane 35 is configured to move the valve body 34 to and hold the valve body 34 in the open position against the physical stop member 36, when there is a milk flow through all of the inlet members 8, i.e. during milking of the animal. The membrane 35 is also configured to hold the valve body 34 in the open position when there is no milk flow, i.e. when all the short milk conduits 9 are closed, since the pressure in the outlet nipple 12 will be lower than in the inner space 3. The teatcups 10 will be closed when all teatcups 10 are hanging downwardly, thereby bending the short milk conduits 9 to close and prevent air from entering the inner space 3 of the claw C.

With reference to FIG. 11, the membrane 35 is configured to move the valve body 34 to and to hold the valve body 34 in the closed position against the valve seat 37, when the milk flow through one of the inlet members 8 is interrupted. When, for instance, one of the teatcups 10 falls off the teat, the membrane 35 is configured to move immediately, or substantially immediately, the valve body 34 to the closed position in order to prevent air from entering the inner space 3 of the claw C.

When the teatcup 10 has fallen down completely the short milk conduit 9 will be closed. Thanks to the leak flow through the leakage channel 38, vacuum or a low pressure is created in the inner space 3, permitting the membrane 35 to move the valve body 34 once again to the open position, thereby permitting milking through the three teatcups 10 remaining on the respective teats. This procedure will be repeated at least also in case a second teatcup 10 falls off the teat, and possibly also in case a third teatcup 10 falls off the teat.

With reference to FIG. 9, the membrane 35 is configured to hold the valve body 34 in the intermediate position, between the closed position and the open position, during the application of the teatcups 10 to the respective teats of the animal. When the operator holds the claw C in an upright position, as illustrated in FIG. 5, before the teatcups 10 are attached to the teats, the teatcups 10 will all hang down and the short milk conduits 9 will be closed. When the operator lifts the first teatcup 10, the membrane 35 will move the valve body 34 from the open position shown in FIG. 12 to the intermediate position shown in FIG. 9. When the first teatcup 10 is attached the membrane 35 will move the valve body back to the open position shown in FIG. 10. This procedure is repeated until all four teatcups 10 have been attached to the respective teats.

The membrane 35 is thus configured to move the valve body 34 first to the intermediate position when a first teatcup 10 is lifted so that air may be sucked into the inner space 3 of the claw. Thanks to the leakage channel 38, the pressure difference over the valve body 34 will be reduced or removed when the valve body 34 is in the closed position, permitting the membrane 35 to move the valve body 34 to the intermediate position. From this intermediate position, the membrane 35 will then move the valve body 34 to the open position when said first teatcup 10 has been attached since the pressure in the inner space 3 will be reduced and become lower than the pressure in the outlet nipple 12. Consequently, the valve body 34 will, as explained above, respond quickly, i.e. open quickly when the first teatcup 10 is attached since the valve body 34 is starting from the intermediate position and thus moved only a short distance from the intermediate position to the open position.

Figure 12:
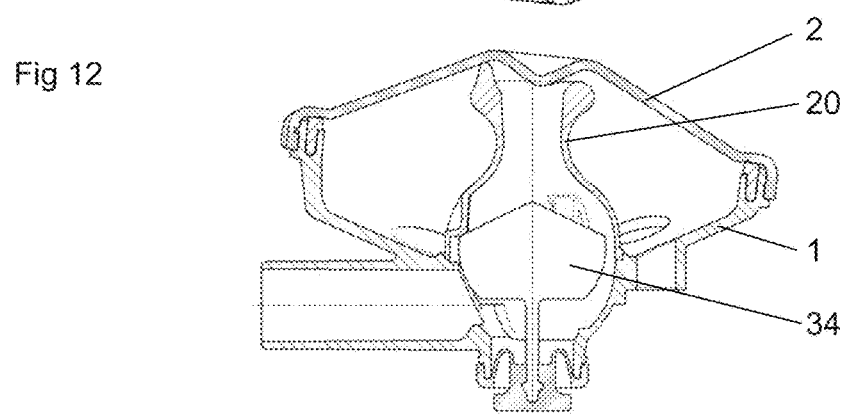
FIG. 12 shows schematically a sectional view of the claw in FIG. 9 in a washing position.

FIG. 12 shows the claw C in a up-side down position, suitable for washing of the claw C and the teatcups 10 of the milking member. The membrane 35 is configured to hold the valve body 34 in the open position during the washing operation. Before the washing operation is initiated, the milking vacuum is shut-off, for instance automatically by means of the shut-off valve 14, which means that the membrane 35 will move the valve body 34 to the intermediate position. The teatcups 10 and the claw C are positioned in the up-side down washing position, whereby the teatcups 10 are placed on suitable washing nozzles (not disclosed). The shut-off valve 14 is opened and the vacuum is applied causing the membrane 35 to move the valve body 34 to the open position so that washing liquid may be sucked and conveyed through the milking member.

The present invention is not limited to the embodiments disclosed, but may be varied and modified within the scope of the following claims.

The invention claimed is:

1. A claw (C) for a milking machine, comprising:
an enclosure having an upper part (1) and a lower part (2) that together enclose an inner space (3) for a milk flow during a milking operation and includes a center axis (x) extending through the upper part (1) and the lower part (2), the center axis (x) defining a thickness direction of the enclosure,
wherein the lower part (2) comprises a bottom surface (4) facing the inner space (3) and the center axis (x) extends through the bottom surface (4), and wherein the upper part comprises an upper wall (16) extending along a cone (k) that is rotary symmetric around the center axis (x);

an outlet nipple (12) extending outwardly from the upper part (1) and providing a milk discharge path from the inner space (3), the outlet nipple (12) configured for connection to a long milk conduit (13) for discharge of milk from the inner space (3); and a suction tube (20) connecting the inner space (3) to the outlet nipple (12) and providing a path that conveys the milk from the inner space (3) to the outlet nipple (12), wherein the suction tube (20) comprises a lower tube section (20a) positioned in proximity of the bottom surface (4), and at least three support legs (21) extending from the lower tube section (20a) and abutting the bottom surface (4), wherein a gap is present between the lower tube section (20a) and the bottom surface (4), wherein each of said at least three support legs (21) has an end point, each end point being located in a common lower plane (p'), and wherein the common lower plane (p') is inclined to the center axis (x) so that the center axis (x) is non-perpendicular to the common lower plane (p').

2. The claw (C) according to claim 1, wherein the suction tube (20) has an upper end defining an upper plane which is inclined to the common lower plane (p').

3. The claw (C) according to claim 2, wherein the suction tube comprises an upper tube section (20c) extending from the upper end to an intermediate tube section (20b), and wherein the intermediate tube section (20b) extends from the upper tube section (20c) to the lower tube section (20a).

4. The claw (C) according to claim 3, wherein the intermediate tube section (20b) is cylindrical.

5. The claw (C) according to claim 3, wherein the upper tube section (20c) is tapered from the upper end to the intermediate tube section (20b) thereby forming an internal space which is concavely shaped.

6. The claw (C) according to claim 5, further comprising a closing valve (33) comprising a valve body (34) provided at the upper tube section (20c).

7. The claw (C) according to claim 6, wherein the closing valve (33) comprises a physical stop member defining an open position, the physical stop member comprising at least three projections (36) projecting into the internal space of the upper tube section (20c).

8. The claw (C) according to claim 7, wherein closing valve (33) further comprises a valve seat (37) defining a closed position, where the valve body (34) rests against the valve seat (37) in the closed position.

9. The claw (C) according to claim 6, wherein the suction tube (20) comprises at least three projections (36) projecting into the internal space of the upper tube section (20c) and defining an end position for the valve body (34).

10. The claw (C) according to claim 1, wherein the suction tube (20) is a separate part friction-fitted to the upper part (1).

11. The claw (C) according to claim 1, wherein the gap has i) a first height at a first position along the lower tube section (20a) and ii) a second height at a second position along the lower tube section (20a), the second position being diametrically opposite to the first position, and the first height being greater than the second height.

12. The claw (C) according to claim 11, wherein the suction tube (20) comprises only three support legs (21) and wherein at least one of the support legs (21) has a length that is different from a length of at least one of the other support legs (21).

13. The claw (C) according to claim 12, wherein the lower tube section (20a) defines an annular end line, and the support legs (21) extend from the annular end line, and wherein the annular end line defines an end plane being inclined in relation to the center axis (x).

14. The claw (C) according to claim 1, wherein the lower tube section (20a) defines an annular end line, and the support legs (21) extend from the annular end line, and wherein the annular end line defines an end plane being inclined in relation to the center axis (x).

15. The claw (C) according to claim 1,
wherein the lower part (2) is detachably connected to the upper part (1) along a connection plane (p),
wherein the upper part (1) further comprises an upper end (5) defining an upper end point (5'), and a lower annular end extending along a periphery of the claw (C) in the connection plane (p), and
wherein the connection plane (p) is inclined with respect to the center axis (x) such that the enclosure has a first thickness at a first peripheral position ($p_1$) and a second thickness at a second peripheral position ($p_2$) diametrically opposite to the first peripheral position ($p_1$), the first thickness being greater than the second thickness.

16. The claw (C) according to claim 1, wherein the lower tube section (20a) further comprises a torus-shaped ring with a first radius (r) when seen in a cross-sectional plane including the center axis, wherein the tube at the lower tube section (20a) has an inner radius (R), and wherein a relation of the first radius to the inner radius (r/R) lies in a range 0.3 to 0.7.

17. The claw (C) according to claim 1, wherein the lower part (2) further comprises a central depression (25) extending inwardly toward the upper part (1).

18. The claw (C) according to claim 1,
wherein the lower part (2) is detachably connected to the upper part (1) along a connection plane (p),
wherein the upper part (1) further comprises i) an upper end (5) defining an upper end point (5'), and a lower annular end extending along a periphery of the claw (C) in the connection plane (p), and ii) a side wall (17) extending from a lower part of the upper wall (16) to the lower annular end, the side wall (17) being outside the cone (k), and
wherein the connection plane (p) is inclined with respect to the center axis (x) such that i) the enclosure has a first thickness at a first peripheral position ($p_1$) and a second thickness at a second peripheral position ($p_2$) diametrically opposite to the first peripheral position ($p_1$), the first thickness being greater than the second thickness, and ii) the side wall (17) has a first wall height at the first peripheral position ($p_1$) and a second wall height at the second peripheral position ($p_1$), the first wall height being larger than the second wall height.

* * * * *